Figure 1:
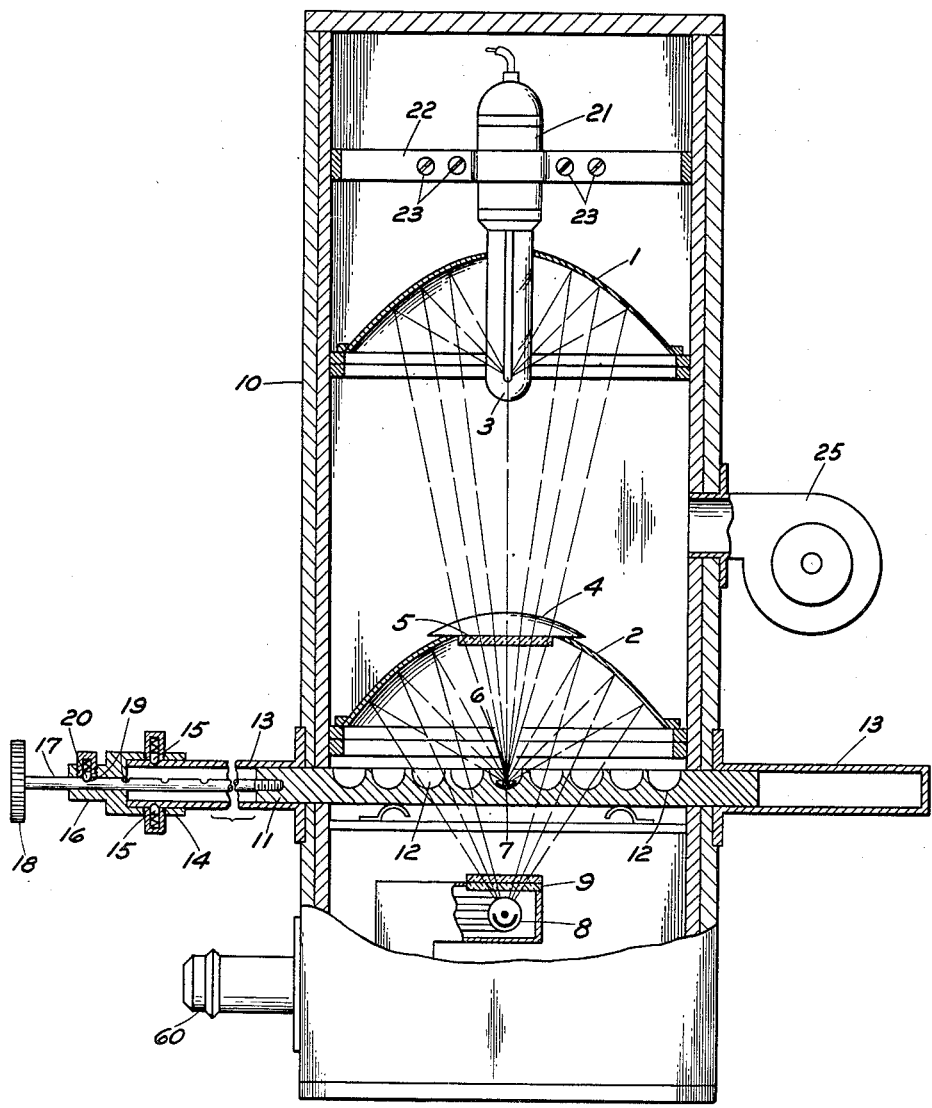

May 1, 1951 C. R. MARSH ET AL 2,551,542
FLUOROPHOTOMETER

Filed Nov. 10, 1948 2 Sheets-Sheet 1

INVENTORS
Charles R. Marsh &
BY Chesley B. Pickle

Roland A. Anderson
ATTORNEY

May 1, 1951 C. R. MARSH ET AL 2,551,542
FLUOROPHOTOMETER
Filed Nov. 10, 1948 2 Sheets-Sheet 2

INVENTORS
Charles R. Marsh &
BY Chesley B. Pickle
Roland A. Anderson
ATTORNEY

Patented May 1, 1951

2,551,542

UNITED STATES PATENT OFFICE 2,551,542

FLUOROPHOTOMETER

Charles R. Marsh, State College, Pa., and Chesley B. Pickle, Baltimore, Md., assignors to the United States of America as represented by the United States Atomic Energy Commission Application November 10, 1948, Serial No. 59,362

8 Claims. (Cl. 250—71)

Our invention relates to systems for detecting fluorescence and more particularly to a fluorophotometer for measuring the intensity of fluorescence of chemical elements when such elements are excited by ultra-violet light, and is especially suited to the detection of the existence of minute quantities of uranium and the like.

One method for determining the amount of uranium in a substance is by alpha counting, that is, determining the number of alpha particles emanating from the substance. This is accomplished by so-called counters and the number of counts is indicative of the amount of uranium.

Another method utilizes the fluorescent property of uranium. It is well known that concentrated solutions of uranium will fluoresce when excited by an ultra-violet light source if the solvent does not absorb the incident ultra-violet light or the fluorescent radiation. See page 87 of Dake and Dement on Fluorescent Light and its Application, published by Chemical Publishing Company of Brooklyn, New York, in 1941. Also, when minute traces of uranium are fused with certain inorganic crystalline materials, the inorganic crystals will fluoresce when excited by ultra-violet light. The most satisfactory of these crystals or "intensifiers" is sodium fluoride. The amount of uranium, which is proportional to the intensity of fluorescence, can then be measured. See Chemical Abstracts, vol. 36, page 5879.

Various forms of apparatus for determining minute amounts of uranium have been designed embodying the latter principle. One such apparatus compares the fluorescence from a standard sodium fluoride bead containing a known amount of uranium with a bead of sodium fluoride fused with the uranium containing substance. The comparison is made while the beads are excited with ultra-violet light.

A second apparatus employs a vertical cylinder with the bead in question mounted near the bottom. An ultra-violet light source excites the bead through a second cylinder mounted at about 45° with respect to the first cylinder. The light from the source passes through a focusing lens and a filter before striking the bead. The filter is designed to pass only ultra-violet light. Fluorescent light from the bead is then directed upward through a focusing lens system and a filter arrangement onto a phototube. The filter in this case is designed to exclude all light but the yellow light produced by the bead. The phototube is connected to a suitable amplifier, previously calibrated, which produces an indication of the amount of uranium in the bead on a visual meter or the like. See page 244 of Dement and Dake, Uranium and Atomic Power, published by Chemical Publishing Company of Brooklyn, New York, in 1945.

The use of the foregoing systems, for the detection of radio-activity, particularly that in uranium, is limited by their sensitivity. The counter systems are both bulky and expensive, and require considerable attention and upkeep. The fluorophotometers of the prior art are likewise bulky due to the necessity for using lenses, and their efficiency is sometimes impaired by the leakage of undesired light rays into the equipment.

Applicants, with a knowledge of these defects in and objections to the prior art, have for an object of their invention the provision of a fluorophotometer which is made highly sensitive to fluorescent light by its use of reflectors to direct the light, while avoiding the bulky lenses of the prior art.

Applicants have as another object of their invention the provision of a fluorophotometer of cylindrical configuration to facilitate the exclusion of light from undesirable sources and increase the sensitivity of the device.

Applicants have as a further object of their invention the provision of a fluorophotometer utilizing reflectors which restrict the travel of the light waves and direct them along predetermined paths, thus reducing to a minimum the loss of light, while increasing sensitivity.

Applicants have as a further object of their invention the provision of a system for detecting quantitatively the existence of minute quantities of radioactive materials, such as uranium, with sensitivity not obtainable even in the larger and more bulky equipment of the electronic type.

Applicants have as a still further object of their invention the provision of a fluorophotometer which is simple in operation and easy in maintenance, and which will permit rapid testing and/or comparison with samples.

Applicants have as a still further object of their invention the provision of a fluorophotometer which is substantially linear in its response over an appreciable range of concentrations of uranium.

Other objects and advantages of our invention will appear from the following specification and accompanying drawings, and the novel features thereof will be particularly pointed out in the annexed claims.

In the drawings, Figure 1 is a longitudinal sectional elevation of a preferred form of our improved fluorophotometer.

Figure 2:
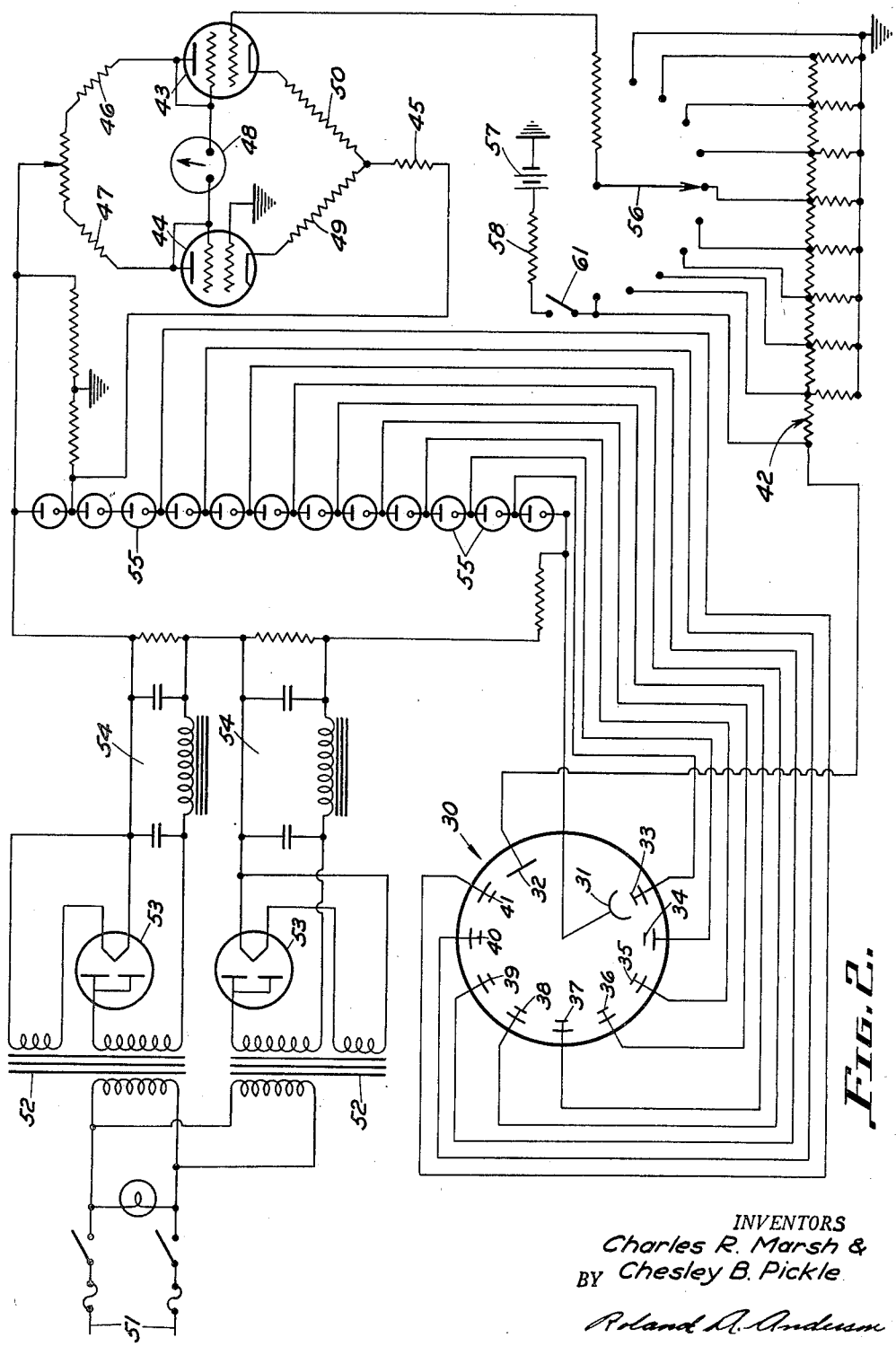

Figure 2 is a schematic form of one circuit which may be employed in the fluorophotometer to facilitate the production of an indication corresponding to the photo-electric effects therein.

Referring to the drawings in detail, two parabolic reflectors 1 and 2 are mounted, one above the other in spaced relation, within a light-tight cylinder or closure 10. As an alternative, the closure may take the form of an elongated substantially rectangular shaped Bakelite box, instead of being cylindrical in configuration. This alternative form may be desired, since it is easier to construct. The reflectors 1 and 2 are preferably so disposed within the cylinder or closure 10 that their concave reflecting surfaces face downwardly. An opening in the center of reflector 1 provides a passage for the ultra-violet light source 3 which projects therethrough and extends downwardly to a point near the focus of the reflector. A source which was found to be satisfactory for this purpose was a General Electric A–H4 mercury lamp. The lamp is supported in position by its socket 21 which is preferably clamped in place by a split supporting clamp 22 joined together through tightening screws 23, 23 and which extends across the upper portion of the chamber of the closure and is carried by the walls thereof. It may be operated from a General Electric type 59–G22 transformer. However, in this arrangement a 30 to 45 minute warm-up period is required for the lamp.

Light rays from source 3 are collected by the reflector 1 and are directed through reflection on to a fresnel focusing lens 4 which is mounted over an opening in the center of silvered parabolic reflector 2. A filter 5 for passing only ultra-violet light is mounted just below the positive lens 4.

A Corning glass filter which will discriminate against and substantially prevent the passage of components of light with wave lengths shorter than .0052 Angstrom units has been found to be satisfactory for this purpose.

Positive lens 4 focuses the ultra-violet on to sample 6, mounted in holder 7. The sample 6 is preferably in the form of a sodium fluoride glass bead containing a minute quantity of uranium fused thereon. Any appropriate method may be employed in preparing the bead, but one suitable method comprehends the purification of the material by electrolysis; then the steps of fuming it with nitric acid to convert the uranium to uranyl nitrate, and then compounding the nitrate with sodium fluoride in the form of a fused bead. This bead when excited with ultra-violet light fluoresces, and the fluorescence produced is proportional to the quantity of uranium in the bead. The fluorescence may be compared with that of standard samples so that the amount of uranium in the test sample may be ascertained.

The sample or bead 6 may be mounted along with a series of other samples including a standard sample, in platinum holders 7 on a slide 11. The slide may be in the form of a rectangular bar having a series of recesses 12, 12 formed therein for the reception of sample holders. The slide 11 extends across the cylinder or closure 10 and is supported in openings therein by the walls of the cylinder or closure and by tubular inclosures or extensions 13, 13 projecting externally from the surface of the cylinder or closure and transversely to the longitudinal axis thereof. They serve to inclose the bar and prevent the ingress of light. Cap 14 telescopes over one extension 13 and is mounted in position by spring detents 15, 15 which engage in or interlock with recesses or slots in the extension. A reduced shaft 17 extends through a thickened block or collar portion 16 of the cap and mounts a knob or handle 18 adjacent the end thereof. The reduced portion or shaft 17 has a series of longitudinally spaced recesses or indentations 19 therein, for the reception of the plunger of a conventional spring detent 20 screw threadedly mounted in the block 16. It will be apparent that the slide functions to progressively place the various samples carried by it in the beam of light from the lens 4. Samples are placed in the various recesses 12, 12 in slide 11 and the slide is inserted in place with cap 14 telescoped over the mating extension 13 and the spring detents 15, 15 seating in the openings or slots therein to retain the structure in place. The samples are then moved from position to position by exerting pressure on the handle 18 to move the shaft 17 into and out of the block 16. The positions are determined by the seating of the detent 20 in the recesses 19 of the shaft. As the detent springs into place in each succeeding recess in shaft 17 it serves to indicate the various positions of the samples. The co-action of the detent 20 with the recesses 19 is such as to retard but not prevent movement of the shaft 17 from position to position in response to the application of force to the handle 18. Thus the slider, in a single operation, permits the insertion of a series of unknown samples for comparison with a know sample while preventing the ingress of light into the chamber of the cylinder or closure. Upon conclusion of the test the slide may be removed and the samples may be replaced with others. In addition, this arrangement comprehends the selective positioning of the samples before the light beam without removal of the slide and while protecting the chamber against the ingress of light from external sources.

The bead 6, and any other example which may be moved into that position, is located below the focus of reflector 2 so that the fluorescent light from the bead 6 is reflected and brought to a small area at photo-tube 8. Just in front of tube 8 is positioned a filter arrangement 9 which discriminates against and effectively excludes all light but fluorescent light from reaching the bead. This filter arrangement preferably comprises two filters, one of which passes all light from the lower end of the spectrum through ultra-violet light and yellow light while blocking out red, and the other acting to block out light from the lower end of the spectrum and passing the yellow light transmitted by the first filter. However, the type of filter arrangement employed is not to be considered a limitation of this invention, since any suitable form or arrangement may be used.

Under the above arrangement it will be seen that only yellow light will pass, while other light will be excluded. Therefore, only the fluorescent light from the bead will reach and fall upon the photo-tube 8. In a preferred arrangement, an electron-multiplier type of photo-tube was employed and an indicating device was connected directly thereto, as is described more in detail hereinafter. In this simplified arrangement the indicating device may be calibrated and the amount of uranium in the bead may be read directly thereon. Since the power and indicating equipment are located externally of the inclusure 10, leads from the equipment ordinarily terminate in a socket or connector 60, of any conventional type, for cooperation with an appropriate cable or plug.

Since the sensitivity and dark currents of the electron multiplier photo-tube vary with temperature, a blower 25 may be provided for communicating with the chamber to circulate air therethrough and maintain or control the temperature. In cooperation therewith light-tight openings may also be provided in the walls of the inclosure to provide for the circulation of air. In addition, the equipment may be placed in an air-conditioned room.

Referring now to Figure 2, disclosing schematically the electronic multiplier tube and indicating circuit, 30 designates an electron multiplier tube which utilizes the phenomenon of secondary emission to amplify signals composed of electronic streams. Light falling on the cathode 31 causes it to emit electrons which are drawn to the electrode 33. The electrons strike electrode 33 causing it to produce an increased number of electrons by secondary emission. These electrons in turn are drawn to electrode 34 where additional electrons are freed by secondary emission. This multiplying process is repeated in each successive stage with an ever increasing stream of electrons until those emitted from the last electrode 41 are collected by the anode 32 and constitute the current utilized in the output circuit. The flow of electrons from electrode to electrode is accomplished by applying larger potentials in equal steps to the succeeding electrodes. The electronic multiplier photo-tube may be of the 1 P-21 type made by the Radio Corporation of America as described in a pamphlet publication by it, and identified as 1 P-21-9-43.

The output of tube 30 is directly connected from the anode 32 through the voltage divider 42 to the control grid of tube 43 of a vacuum tube voltmeter circuit. While it serves as a vacuum tube voltmeter, it is unlike the usual balanced vacuum tube voltmeter circuit since the tubes 43 and 44 are linked by means of a common cathode resistor 45. Because of this coupling, any change in the input voltage of the grid of tube 43 changes the cathode bias of tube 44, and as a result, a change in the plate current of tube 43 is accompanied by a simultaneous change in the plate current of tube 44 in the opposite direction. The differential voltage thus developed across the load resistors 46, 47 is applied to the meter 48 which is calibrated in terms of voltage applied to the control grid of tube 43. It may be a Triplitt 50 microampere meter with a five inch scale. Readings may be by visual observation. A controlled amount of inverse feed back to obtain independence of tube characteristics is secured by the presence of the two resistors 49, 50 in the cathode circuits of tubes 44, 43. The vacuum tube voltmeter type of circuit may be of the general form made by Radio Corporation of America and designated "Junior Volt-Ohmyst" type No. 165-A. See RCA Bulletin No. 1B-320-41-6.

The power for the photo-tube and the vacuum tube voltmeter circuit may be supplied from the usual power line 51 through transformer or transformers 52, 52, rectifiers 53, 53 and filters 54, 54, or a more compact unit might include a single transformer, rectifier and filter. The voltages to the tube 30 are regulated by a series of voltage regulator tubes 55, 55, etc. connected in a bank in series with each other and across the output of the power supply. They serve as a potential divider, placing progressively larger potentials on the electrodes 33, 34, 35, 36, 37, 38, 39, 40, and 41 as the anode 32 is approached.

Sensitivity of the instrument can be varied by steps with the attenuator shown, providing a range of attenuation from 2X to 512X. Variation is accomplished with the selector switch 56 connecting the input of the vacuum tube voltmeter circuit to the load resistor 42 and the anode circuit of the tube 30.

A bucking current from source 57 passing through the resistor 58 may be connected into the circuit by closing switch 61 and utilized to impress a voltage across the load resistor 42 to give a zero input to the vacuum tube voltmeter circuit when no sample is under test and when no fluorescence is present.

Having thus described our invention, we claim:

1. A fluorophotometer of the character described comprising an elongated tubular inclosure, a source of ultra-violet light radiations positioned in said inclosure adjacent one extremity thereof, a fluorescent sample adapted to be excited by said source positioned in an intermediate portion of the inclosure, and a light sensitive device positioned in the inclosure adjacent the other extremity of the inclosure, a reflector for directing light rays from said source upon the sample to produce fluorescence, and an additional reflector for directing the fluorescence upon the light sensitive device.

2. A fluorophotometer of the character described comprising an elongated inclosure, a source of ultra-violet radiations disposed therein, a sample carrier for mounting a plurality of samples and selectively bringing each of them into the rays from said source to produce fluorescence, and a light sensitive device disposed within the inclosure for detecting the fluorescence from the samples.

3. A fluorophotometer of the character described comprising an elongated inclosure, a source of ultra-violet radiations disposed within the inclosure adjacent one end thereof, a sample carrier in the intermediate portion of the inclosure for mounting a plurality of samples and selectively positioning them in the paths of the rays from said source to produce fluorescence, and a light sensitive device positioned adjacent the opposite end of the inclosure for detecting fluorescence from the samples.

4. A fluorophotometer of the character described comprising an elongated inclosure, a source of ultra-violet radiations disposed therein, a sample carrier extending transversely of the inclosure for progressive movement to bring samples of a series into the path of the radiations to produce fluorescence, a light sensitive device for measuring fluorescence of the samples, a reflector positioned adjacent the source for directing the radiations therefrom to a predetermined position, and means for directing the fluorescence from the samples upon the light sensitive device.

5. A fluorophotometer of the character described comprising an elongated inclosure, a source of ultra-violet radiations disposed within the inclosure adjacent one extremity thereof, a sample carrier for mounting a plurality of samples, said carrier extending across an intermediate portion of the inclosure and movable to selectively position each of the samples within the paths of the radiations from the source, a reflector for directing the radiations from the source along paths to produce fluorescence in said samples, a light sensitive device positioned adjacent the opposite extremity of the inclosure for detecting the fluorescence, and means for directing the fluorescence from the samples upon the light sensitive device.

6. A fluorophotometer of the character described comprising an elongated inclosure, a source of ultra-violet radiations disposed therein, a reflector for directing the radiations from said source along a restricted path, a sample carrier for mounting a plurality of samples, said carrier being movable to selectively position each of the samples in the path of said radiations to produce fluorescence, a light sensitive device positioned in the inclosure, and a reflector for directing the fluorescence from the samples upon said device.

7. A fluorophotometer of the character described comprising an elongated inclosure, a source of ultra-violet radiations disposed therein adjacent one extremity, a reflector for directing the radiations from said source along a predetermined path towards an intermediate portion of the inclosure, a sample carrier in the intermediate portion of the inclosure for mounting a plurality of samples in spaced relation, said carrier being movable to progressively position each of the samples in the path of the radiations and produce fluorescence, a light sensitive device positioned in the inclosure adjacent the opposite extremity, and an additional reflector for directing the fluorescence upon said device.

8. A fluorophotometer of the character described comprising an elongated closed tubular inclosure for preventing the ingress of light, a source of ultra-violet radiations disposed within the inclosure adjacent one extremity thereof, a reflector extending about the source for directing the radiations in a restricted path towards the intermediate portion of the inclosure, a slide extending transversely of the intermediate portion of the inclosure for mounting a series of samples in spaced relation, said slide being movable across the inclosure to selectively position each of the samples in the path of the radiations from the source to produce fluorescence, a light sensitive device positioned in the other extremity of the inclosure, and an additional reflector positioned adjacent the samples for directing the fluorescence upon said device.

CHARLES R. MARSH.
CHESLEY B. PICKLE.

REFERENCES CITED

The following references are of record in the file of this patent:

UNITED STATES PATENTS

| Number | Name | Date |
|---|---|---|
| 2,122,824 | Pick | July 5, 1938 |
| 2,217,991 | Peck et al. | Oct. 15, 1940 |
| 2,297,939 | Campbell | Oct. 6, 1942 |
| 2,305,082 | Hocott | Dec. 15, 1942 |
| 2,337,465 | Heigl | Dec. 21, 1943 |
| 2,451,885 | Stevens et al. | Oct. 19, 1948 |

OTHER REFERENCES

Photomultiplier Radiation Detector by Coltman and Marshall, Nucleonics, Nov. 1947, page 59.